J. L. CREVELING.
ELECTRIC REGULATION.
APPLICATION FILED JAN. 15, 1912. RENEWED AUG. 15, 1918.

1,380,885.

Patented June 7, 1921.

WITNESSES

INVENTOR
John L. Creveling

UNITED STATES PATENT OFFICE.

JOHN L. CREVELING, OF NEW YORK, N. Y., ASSIGNOR TO SAFETY CAR HEATING AND LIGHTING COMPANY, A CORPORATION OF NEW JERSEY.

ELECTRIC REGULATION.

1,380,885.  Specification of Letters Patent.  Patented June 7, 1921.

Application filed January 15, 1912, Serial No. 671,166. Renewed August 15, 1918. Serial No. 250,080.

*To all whom it may concern:*

Be it known that I, JOHN L. CREVELING, a resident of New York, in the county and State of New York, have invented certain new and useful Improvements in Electric Regulation, as set forth in the annexed specification and drawing, forming a part thereof.

My invention pertains to that class of electric regulation wherein it is desired to automatically regulate a dynamo or generator in a predetermined manner.

As my invention is particularly applicable to systems of electric distribution wherein a variable speed dynamo is used to charge a storage battery and operate lamps or other translating devices, it will be described with reference to such a system.

Figure 1:
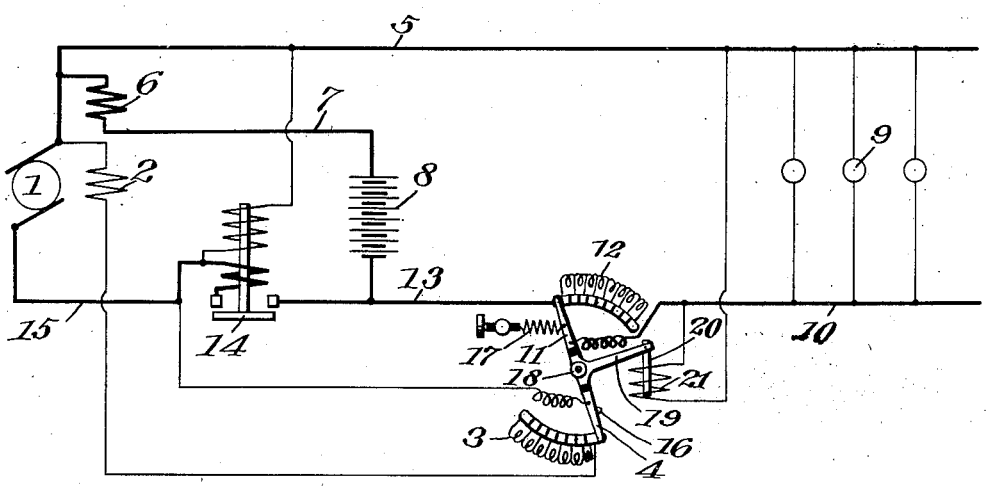

In the drawing Figure 1 is a diagrammatic representation of one type of system embodying the essentials of my invention.

Figure 2:
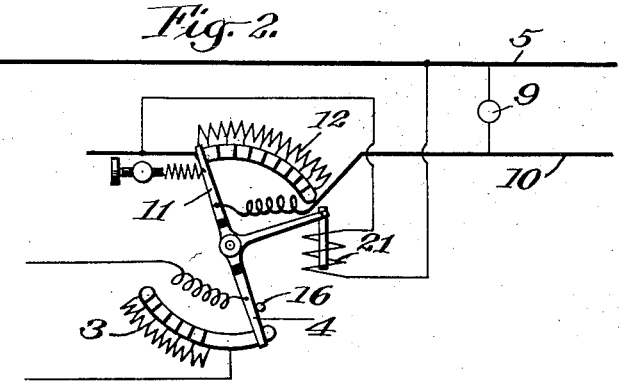

Fig. 2 is another form of a portion of the system shown in Fig. 1.

In the drawing, referring to Fig. 1, 1 represents a dynamo or generator provided with a field exciting coil 2 in shunt across the generator and having in series therewith the variable resistance indicated at 3, the value of which depends upon the position of the contact arm 4 as indicated conventionally. 5 represents the positive lead of the generator which is connected with one end of a differential series coil 6 opposing the magneto-motive force of the coil 2 and having its opposite terminal connected as by the wire 7 to the positive side of the storage battery 8, and the lead 5 continues to the positive side of the lamps or other translating devices indicated at 9. The negative terminals of the lamps or translating devices 9 are connected with the main 10 which is led to the insulated lever 11 coöperating with the variable resistance 12 in such manner that the position of the lever 11 determines the dimensions of the resistance 12 in series with the main 10. The resistance 12 has one end in communication with the main 13 connected with the negative side of the storage battery 8 and one side of the automatic switch 14, the opposite side of which is connected with the negative terminal of the generator as by lead 15. The automatic switch 14 is preferably one of that type adapted to close the generator circuit when the voltage of the generator is substantially equal to that of the storage battery and to open the same when the generator voltage is very slightly below that of the battery, and as many switches of this character are well known in the art, one of the well-known types is merely represented in the drawing diagrammatically in order to denote its presence. The levers 4 and 11 are insulated from and carried by a member pivoted at 18 and provided with an arm 19 carrying at one extremity a core of iron or other magnetic material indicated at 20, surrounded by a solenoid 21 in shunt across the translation circuit and tending when energized to draw the core 20 downwardly and depress the lever 19. The adjustable spring 17 normally tends to draw the levers 4, 11 and 19 into the position shown in the drawing, and the stop 16 limits the motion that may be given the levers by the said spring 17 in a counter-clockwise direction.

In Fig. 2 a slightly different form of resistance device is shown, the same being so constructed that resistance 12 may be inserted in the translation circuit without affecting the regulation of the generator throughout a predetermined motion of the levers for a purpose as will hereinafter appear and the coil 21 is across the battery circuit.

An operation of my invention is substantially as follows:

Starting with the generator at rest and the storage battery supplying the lamps or translating devices, under which conditions back discharge from the battery to the generator will be interrupted by the switch 14, current will flow to the translating devices as follows:

From the battery 8 through the wire 7, differential coil 6, lead 5, translating devices 9, lead 10, lever 11, resistance 12 and main 13 to the battery. The battery current thus flowing through the coil 6 in the reverse direction to the charging current will tend to energize the generator field and tend to make the same pick up at low speed. If, now, the generator be started current will flow from the generator through the field coil 2, resistance device 3 and lever 4 and this field current may be regulated by manipulation of resistance 3. If the generator speed be such that its voltage be substantially equal to that of the battery, the fine wire closing coil of the switch 14 in shunt across the generator will cause the switch to close and then if the generator voltage be raised until sufficient to charge the storage battery and supply current to the lamps or translating devices, current will flow from the generator 1 through lead 5, differential coil 6, wire 7 and battery 8 to the main 13 and thence to the switch 14 and through switch 14 and the coarse winding thereof in such manner as to assist in holding the switch closed and then through 15 to the generator. Current will also flow from the lead 5 through the translating devices 9, main 10, resistance device 12 and lead 13 to the generator, and it will be obvious that the current flowing from the generator to the battery 8 will, by passing through the differential coil 6, tend to cut down the field excitation set up by the field coil 2 and in this way cause the generator to be self-regulated for increase in speed. That is, the speed of the generator may be greatly increased without increasing the voltage thereof proportionately owing to the fact that slight increases in voltage will cause considerable increases in current in the coil 6 due to the fact that the battery 8 is of low resistance and may be treated as a counter-electromotive force element having very low resistance. However, in order to charge the battery 8 there must necessarily be a higher voltage across its terminals than the battery has across its terminals when supplying current to the translating devices, and I so adjust the spring 17 that when the voltage across the translating circuit is equal to the normal voltage that can be supplied by the battery any appreciable increase above this amount will cause the solenoid 21 to draw the core 20 downwardly so as to swing the arm 19 and thus move the lever 11 to increase the resistance 12 and hold the voltage upon the translating circuit substantially constant. This movement of the core 20 will cause the resistance 3 to be inserted in circuit with the field coil 2 and diminish the charging current from the generator necessary in the coil 6 to prevent the said charging current from exceeding certain limits upon increases in speed. That is, if the battery voltage rise, as for example, as the same is approaching a charged condition, the generator voltage will also tend to rise therewith and maintain a substantially constant current in the coil 6 for a given speed for example. However, as the resistance 12 is inserted by the coil 21 to compensate for this rise and hold the lamp circuit voltage constant, it will also increase the resistance in series with the coil 2 and, therefore, require a lesser current in the coil 6 with the result that the generator output for a given condition will be lessened as the voltage across the battery rises and, as the same becomes charged, its charging current will become tapered.

If the resistance device be of that type shown in Fig. 2, it may be connected as shown in Fig. 1 with the solenoid 21 across the translation circuit and the operation will be substantially the same as that above described, with the exception that resistance may be inserted in the translation circuit to compensate for certain rises in voltage across the generator and battery without inserting any resistance in the field circuit. That is, for example, the solenoid 21 may swing the levers 4 and 11 throughout a certain arc and insert resistance in the translation circuit while the lever 4 still remains upon the blank segment of the resistance device 3, and, therefore, cause no appreciable change in the resistance in series with the field circuit, which is an operation sometimes found to be desirable. If either of the resistance devices shown in Figs. 1 and 2 be connected as shown in Fig. 2 with the solenoid 21 across the generator and battery circuit, substantially the same operation as above outlined will take place with the exception that the variation in voltage across the generator and battery circuit may be used to insert resistance into the lamp circuit for the purpose of regulating its voltage and to operate the field regulating resistance.

I do not wish in any way to limit myself to the details of construction nor to the exact mode of operation set forth in this specification and drawing to illustrate one type of system embodying the essentials of my invention, for it is obvious that wide departure may be made in the way of details without departing from the spirit and scope of my invention, which is as set forth in the following claims:

1. The combination with a generator and its field coil, a storage battery and a work circuit, of a coil responsive to battery current fluctuations for directly regulating the field of said generator, a regulator in the work circuit for regulating the potential thereof, a coil for controlling said regulator responsive to voltage fluctuations and means whereby said regulator coöperates with said current coil in the control of the generator field.

2. The combination with a generator, a work circuit, a storage battery, a battery current responsive coil directly regulating the generator, a regulator for the translation circuit and means for operating the same responsive to voltage fluctuations, of means whereby said regulator coöperates with the current responsive coil in the regulation of the generator.

3. The combination with a generator, a work circuit, a storage battery and means responsive to battery current fluctuations directly regulating the generator, of means for regulating the work circuit voltage, a coil responsive to voltage fluctuations for controlling the same and means whereby said coil acts to coöperate with the current responsive means in the regulation of the generator.

4. The combination with a generator, a work circuit, a storage battery and means for directly regulating the generator responsive to battery current fluctuations, of means for independently regulating the voltage on the work circuit responsive to voltage fluctuations and means whereby said last mentioned means coöperates with the first mentioned means in the regulation of the generator.

5. The combination with a work circuit, a storage battery, and a generator having a shunt field coil, of battery current responsive means directly affecting the generator field, voltage responsive means for affecting the work circuit, and means whereby the voltage responsive means coöperates with the current responsive means in the regulation of the generator.

6. The combination with a work circuit, a storage battery, a generator supplying the same and a battery current coil directly affecting the regulation of said generator, of voltage responsive means for regulating the work circuit and means whereby said voltage responsive means coöperates with the current responsive coil in the regulation of the generator.

7. The combination with a storage battery, a generator, battery current responsive directly regulating means therefor, and a translation circuit, of means responsive to fluctuations in voltage for regulating the translation circuit and affecting the generator.

8. The combination with a generator, a storage battery, and a work circuit, of differential means responsive to battery-charging current and constantly operative for regulating the generator, and means operated by variations in voltage tending to hold the work circuit voltage constant and independently affect current regulation of the generator.

9. A system of electrical distribution comprehending a storage battery, a generator, a current responsive directly regulating means therefor and a work circuit combined with voltage operated means for holding the voltage across the work circuit substantially constant throughout variations in voltage across the generator and means actuated thereby to assist the current responsive means in the regulation of the generator.

10. A system of electrical distribution comprehending a storage battery, a generator, battery current responsive means directly regulating the same, a storage battery and a work circuit, combined with means in the work circuit capable of altering the voltage thereof, means responsive to changes in voltage for operating said voltage altering means to hold the voltage across the work circuit substantially constant throughout changes in storage battery and generator voltage and means whereby said operating means affects the regulation of the generator.

11. A system of electrical distribution comprehending a storage battery, a generator, battery current affected means for directly regulating the same and a work circuit, of means in the work circuit affecting the voltage thereof, means for operating the same affected by voltage fluctuations and means coöperating therewith to assist the current responsive means in the regulation of the generator.

12. A system of electrical distribution comprehending a storage battery, a generator, battery current responsive means directly affecting the regulation thereof, a work circuit and means for affecting the voltage upon the same, a voltage responsive coil for operating said means and means operated by said coil for affecting the regulation of the generator.

13. The combination with a storage battery, a generator having a field circuit, and a work circuit, of a coil responsive to battery current fluctuations directly affecting the field circuit of said generator, a regulator in the work circuit, means for controlling said regulator responsive to voltage fluctuations and means whereby said regulator coöperates with said current coil affecting the generator field.

14. The combination with a storage battery, a generator, a work circuit and a battery current responsive coil directly affecting the output of the generator, of a regulator for the work circuit, means for operating the same responsive to voltage fluctuations and means whereby said regulator coöperates with the current responsive coil in the regulation of the generator.

15. The combination with a storage battery, a work circuit, a generator and a shunt field circuit therefor, of battery current responsive means directly affecting said field circuit, voltage responsive means for affecting the work circuit and means whereby the voltage responsive means affects the shunt field circuit.

16. The combination with a storage battery, a generator, a shunt coil maintaining a field circuit therefor and battery current responsive means directly affecting said field circuit, of voltage responsive means for affecting the work circuit and means whereby the voltage responsive means coöperates with the current responsive means in the regulation of the generator.

17. The combination with a storage battery, a generator having a field circuit, battery current responsive means directly affecting said field circuit and a work circuit, of means operated by variations in voltage for affecting the voltage upon the work circuit and means operated thereby to affect the generator field circuit.

18. A system of electrical distribution comprehending a storage battery, a generator having a field exciting coil, battery current responsive means directly influencing the effect of said coil and a work circuit, of means in the work circuit affecting the voltage thereof, means for operating the same affected by voltage fluctuations and means operated thereby affecting the current in said exciting coil.

19. A system of electrical distribution comprehending a storage battery, a generator provided with a field magnet, battery current responsive means magnetically affecting said field magnet, a work circuit and means for affecting the voltage upon the same, a voltage responsive means for operating said affecting means and means controlled thereby for affecting the strength of said field magnet.

20. The combination with a storage battery, a work circuit and a generator provided with a field exciting coil, of an opposing coil responsive to battery current fluctuations, voltage responsive regulating means for affecting the work circuit and means controlled thereby for affecting the operation of the field exciting coil.

21. The combination with a storage battery, a work circuit and a generator having a field exciting coil, of a battery current responsive regulator therefor comprising a differential field coil, means for regulating the work circuit in response to voltage fluctuations and means whereby said regulating means affects the exciting value of the field exciting coil.

22. The combination with a storage battery, a work circuit, a generator provided with an armature and a field exciting coil responsive to voltage fluctuations of said armature, of means for regulating the generator comprehending an opposing coil responsive to battery current fluctuations, means for regulating the work circuit responsive to voltage fluctuations and means whereby said voltage fluctuations affect the effect of the field exciting coil.

23. The combination with a storage battery, a work circuit and a generator provided with a field exciting coil, of an internal regulating means responsive to battery current fluctuations opposing the effect of said coil and voltage operated means for regulating the work circuit and affecting the field exciting coil.

24. The combination with a generator having means for self-regulation for increase in speed, including means responsive to battery charging current, a work circuit, a regulator for the latter, and means coöperating with the work circuit regulator for affecting the action of the generator in its self-regulation.

JOHN L. CREVELING.

Witnesses:
ANNA M. WALL,
ISADORE FINKLER.